Sept. 6, 1932. L. K. SNELL 1,875,945
BRAKE
Filed March 12, 1930
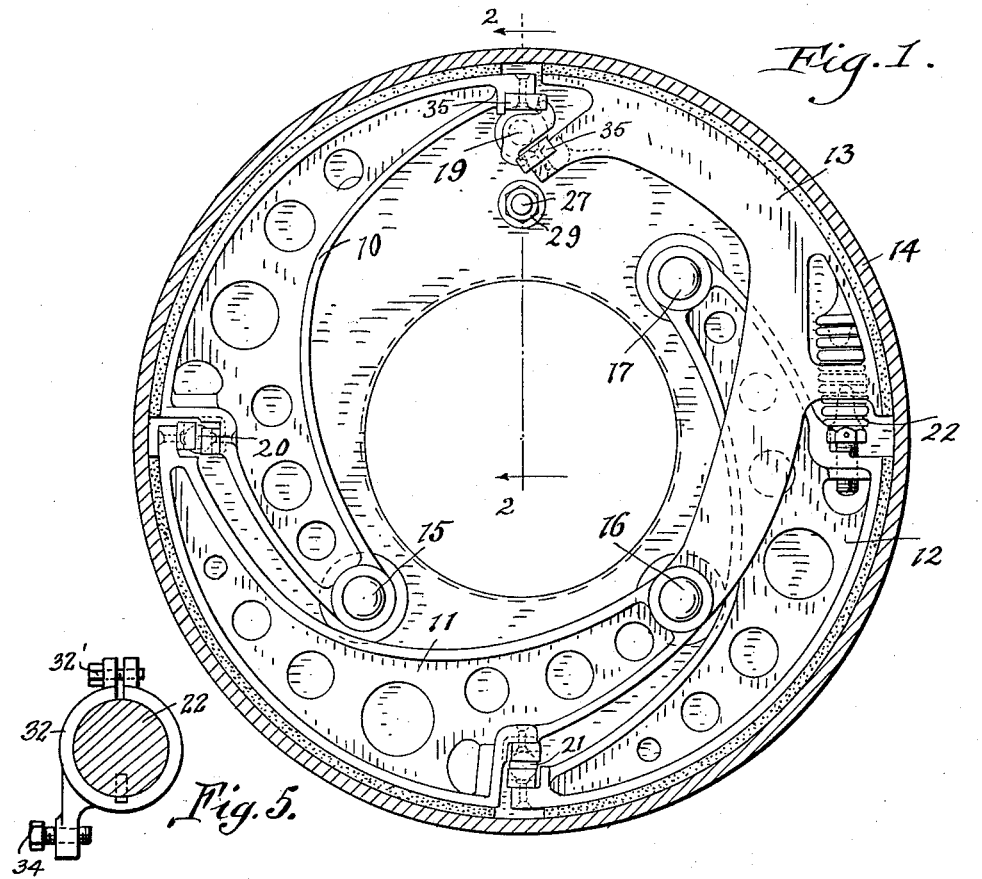
Fig. 1.
Fig. 5.
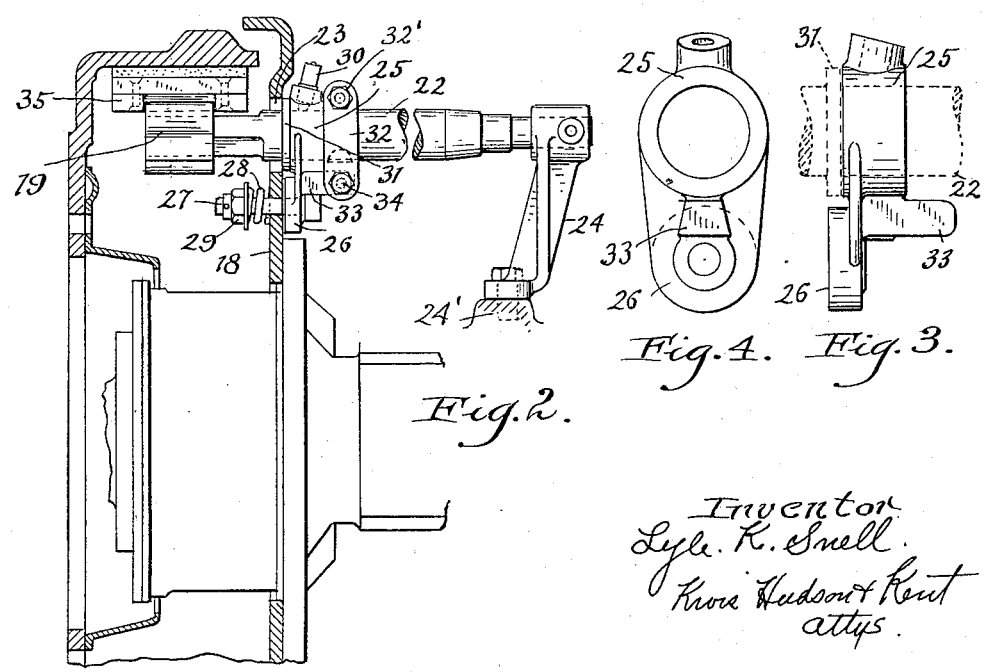
Fig. 2. Fig. 4. Fig. 3.
Inventor
Lyle K. Snell
Knois Hudson & Kent
attys.

Patented Sept. 6, 1932

1,875,945

UNITED STATES PATENT OFFICE

LYLE K. SNELL, OF DETROIT, MICHIGAN, ASSIGNOR TO THE EATON MANUFACTURING COMPANY, OF CLEVELAND, OHIO, A CORPORATION OF OHIO

BRAKE

Application filed March 12, 1930. Serial No. 435,188.

This invention relates to vehicle brakes, and for its principal object aims to provide an improved form of brake having parts arranged to prevent lubricant, which is supplied to the brake actuating mechanism, from reaching the braking surfaces.

It is also an object of this invention to provide a brake having an improved form of brake actuating mechanism.

Further objects and advantages of this invention will be apparent from the following description, taken in connection with the accompanying sheet of drawing, in which Figure 1 is an elevational view with parts in section, showing a brake embodying my invention.

Figure 2 is a sectional view taken on line 2—2 of Fig. 1,

Figure 3 is a side elevational view of the operating shaft bearing;

Figure 4 is an end elevational view of the bearing shown in Fig. 3, and

Figure 5 is a detail view of the operating shaft clamp.

In the drawing, to which I shall now refer in detail, I have shown one form of vehicle brake, which, according to my invention, is so constructed that lubricant, supplied to the actuating mechanism, is prevented from entering the brake drum. It should be understood, however, that my invention may also be embodied in various other forms of brake construction.

The brake, which I have illustrated as an embodiment of my invention, is of the type disclosed in my copending application, Serial No. 400,776, filed October 19, 1929. In a brake of this type a plurality of circumferentially arranged brake shoes 10, 11, 12 and 13 cooperate with the inner surface of the rotatable brake-drum 14. The shoes 10, 11 and 12 are pivotally mounted, respectively, upon the anchor pins 15, 16 and 17, which are carried by the stationary backing plate 18. The shoe 13 is also pivotally mounted upon the anchor pin 16, this shoe being provided with an opening through which the arm of shoe 12 extends. A suitable actuating cam 19 is interposed between the adjacent ends of the shoes 10 and 13 for wedging these shoes outwardly against the brake drum. A roller 20 is interposed between overlapping portions of the shoes 10 and 11, so that movement of the shoe 10 outwardly by the actuating cam 19, transmits braking force to the shoe 11. A similar roller 21 is interposed between overlapping portions of shoes 11 and 12, and likewise, outward movement of the shoe 11 transmits braking force to the shoe 12. A coiled spring 22 is arranged between the adjacent heel portions of the shoes 12 and 13 for urging all of the shoes toward released position.

The cam 19 is carried upon the outer end of a substantially horizontally extending operating shaft 22, which projects into the brake drum through an opening 23 provided in the backing plate 18. This opening may be of suitable size and shape to accommodate the passage therethrough of the actuating cam. The inner end of the operating shaft is rotatably supported in a bearing 24, which is mounted upon a portion of the vehicle structure, such as the axle housing 24′, while its outer end is rotatably supported by a bearing 25, which is mounted upon the backing plate. This bearing is provided with an arm 26, which is pivotally mounted upon the pin 27, so as to allow movement of the bearing with respect to the backing plate and thus permit the actuating cam to center itself between the shoes with which it cooperates. The pivot pin 27 is preferably constructed in the form of a bolt which extends through the backing plate and through the coiled spring 28. By adjustment of the nut 29 the spring 28 may be compressed to provide frictional resistance between the arm 26 and the backing plate.

It will be noted, that the arm 26 is so arranged with respect to the body portion of the bearing, that when the arm is clamped against the backing plate the bearing is supported with its body portion entirely outside of the brake drum and spaced inwardly away from the backing plate.

The bearing 25 is provided with a suitable fitting 30, by means of which a lubricant can be forced between the surfaces of the bearing and of the operating shaft mounted therein.

If lubricant escapes from the bearing it will not interfere with the braking surfaces within the drum because the bearing itself is located wholly outside of the drum, and as the outer end of the bearing is spaced from the backing plate the lubricant escaping at this end leaves the bearing without entering the drum. In addition to spacing the bearing inwardly from the backing plate, I provide other means for preventing the transfer of lubricant from this bearing to the interior of the drum through the opening 23 of the backing plate, in the form of a collar or enlarged portion 31 upon the operating shaft. When the parts are in assembled position this collar is located between the bearing and the opening through the backing plate. In this position the collar bears against the outer end of the bearing and tends to retain the lubricant therein. If lubricant escapes from the outer end of the bearing it will be deflected by the collar 31 away from the opening through the backing plate, so that this escaping lubricant will not reach the braking surfaces within the drum.

For holding the collar 31 in engagement with the outer end of the bearing 25, I provide the clamp 32 which is keyed to the operating shaft and clamped in place by the bolt 32', so as to engage the inner end of the bearing. The bearing is formed with a stop 33 which extends into the path of movement of the clamp to provide means for limiting the rotation of the operating shaft in the brake releasing direction. If desired, the clamp 32 may be provided with a screw 34 arranged to engage the stop 33 and, by adjustment of this screw, the extent of movement of the operating shaft in the releasing direction may be varied.

In addition to its function as a means for retaining or deflecting the lubricant supplied to the bearing, the collar cooperates with the clamp 32 in forming a positioning or locating means for the actuating cam 19, and in forming a centering means for the brake shoes. The collar prevents axial movement of the operating shaft in one direction, while the clamp 32 prevents movement of this shaft in the opposite direction, with the result that the actuating cam is properly positioned and maintained against axial movement within the brake drum. As clearly shown in Figs. 1 and 2 the ends of the actuating cam engage in slots provided in the bearing members 35 secured to the adjacent free ends of shoes 10 and 13. The width of these slots, as shown in Fig. 2, is substantially equal to the axial dimension of the cam, so that by maintaining the operating shaft and cam against axial movement, the interengagement of the cam and bearing portions will properly center the free ends of the shoes 10 and 13.

It will now be readily seen that I have provided simple and efficient means for preventing lubricant, which escapes from the operating mechanism, from reaching the cooperating braking surfaces within the drum. In addition to serving as a means for deflecting escaping lubricant away from the opening of the backing plate through which the operating shaft extends, the collar on this shaft also serves as a means for retaining the lubricant within the bearing, and also as a means for preventing grit or foreign matter from entering the bearing, or from passing through the opening in the backing plate into the drum. This collar also cooperates with the clamp 32 to provide a means for locating the actuating cam 19, and for centering the adjacent free end of the brake shoes, so that these parts cooperate in the most efficient manner with each other and with the brake drum.

While I have illustrated and described the device of my invention in a detailed manner, it should be understood, however, that I do not intend to limit myself to the precise details shown and described, but regard my invention as including such changes and modifications as do not involve a departure from the spirit of the invention and the scope of the appended claims.

Having thus described my invention what I claim is:

1. In a brake the combination of a drum, a backing plate adjacent said drum, a friction device, and friction device actuating means including a bearing movably mounted on said backing plate, an operating shaft rotatable in said bearing, and means for preventing the transfer of lubricant from said bearing to said friction device.

2. In a brake the combination of a drum, a backing plate adjacent said drum, a friction device, and friction device actuating means including a bearing mounted on said backing plate exteriorly thereof, an operating shaft rotatable in said bearing and extending through an opening in said backing plate, and a collar on said shaft exteriorly of said backing plate and engaging said bearing for preventing lubricant supplied to said bearing from entering said drum through said opening.

3. In a brake the combination of a drum, a backing plate adjacent said drum, a friction device, and friction device actuating means including a bearing mounted on said backing plate exteriorly thereof, an operating shaft rotatable in said bearing and extending through an opening in said backing plate, and means between said bearing and said backing plate for preventing lubricant supplied to said bearing from entering said drum through said opening, said means comprising a collar integral with said shaft.

4. In a brake the combination of a drum, a friction device, and actuating means including a shaft having its outer end extending into said drum, a bearing for said shaft, a collar on said shaft intermediate said outer end and said bearing, and means for holding said collar against said bearing.

5. In a brake the combination of a drum, a friction device, and actuating means including a shaft having its outer end extending into said drum, a bearing for said shaft, a collar on said shaft engaging one end of said bearing, means movable with said shaft and engaging the other end of said bearing, and means on said bearing extending into the path of said movable means for limiting the rotational movement of said shaft in one direction.

6. In a brake the combination of a drum, a friction device in said drum, a cam for moving said device into engagement with said drum, an operating shaft on which said cam is carried, a bearing for said shaft, and means for locating said cam with respect to said device comprising a collar on said shaft engaging one end of said bearing and preventing axial movement of said shaft in one direction, and means on said shaft engaging the end of said bearing and preventing axial movement of said shaft in the opposite direction.

7. In a brake the combination of a drum, a friction device in said drum, a cam for moving said device into engagement with said drum, an operating shaft on which said cam is carried, a bearing for said shaft, and means for locating said cam with respect to said device comprising a collar on said shaft engaging an end of said bearing and preventing axial movement of said shaft in one direction, and a clamp on said shaft engaging another end of said bearing and preventing axial movement of said shaft in the opposite direction.

8. In a brake the combination of a drum, a backing plate adjacent said drum, a friction device, actuating means for moving said device into engagement with said drum including a shaft extending through said backing plate, a bearing for said shaft mounted on said backing plate and having an outer end portion thereof spaced inwardly away from said backing plate, means for supplying lubricant to said bearing, and lubricant deflecting means surrounding said shaft adjacent said outer end portion to prevent lubricant escaping from said bearing from entering said drum.

In testimony whereof, I hereunto affix my signature.

LYLE K. SNELL.

CERTIFICATE OF CORRECTION.

Patent No. 1,875,945.   September 6, 1932.

LYLE K. SNELL.

It is hereby certified that the name of the assignee in the above numbered patent was erroneously described and specified as "The Eaton Manufacturing Company", whereas said name should have been described and specified as Eaton Manufacturing Company, as shown by the records of assignments in this office; and that the said Letters Patent should be read with this correction therein that the same may conform to the record of the case in the Patent Office.

Signed and sealed this 22nd day of November, A. D. 1932.

(Seal)

M. J. Moore,
Acting Commissioner of Patents.